United States Patent [19]
Haefele

[11] 3,875,795
[45] Apr. 8, 1975

[54] DEVICE FOR THE TESTING OF CONTACT SPRINGS

[75] Inventor: Roland Haefele, Schriesheim-Altenbach, Germany

[73] Assignee: Societe Industrielle Honeywell Bull (Societe Anonyme), Paris, France

[22] Filed: May 24, 1972

[21] Appl. No.: 256,490

[52] U.S. Cl. .................................. 73/161; 73/141 R
[51] Int. Cl. ............................................ G01l 5/00
[58] Field of Search ............... 73/161, 100, 141 R; 324/28 R

[56] References Cited
UNITED STATES PATENTS

| | | |
|---|---|---|
| 2,338,826 | 1/1944 | Summers ............................ 73/161 |
| 2,483,867 | 10/1949 | Anderson et al. .................... 73/161 |
| 2,573,488 | 10/1951 | Raetsch et al. ...................... 73/161 |
| 2,789,430 | 4/1957 | Sinclaire ............................. 73/161 |
| 3,165,926 | 1/1965 | Orr et al. ............................ 73/161 |
| 3,282,096 | 11/1966 | Bullard et al. ...................... 73/161 |
| 3,292,430 | 12/1966 | Collier et al. .................. 73/141 AB |

Primary Examiner—Charles A. Ruehl
Attorney, Agent, or Firm—Fred Jacob

[57] ABSTRACT

A device is provided for the simultaneous testing of a plurality of contact springs such as are employed with printed circuit boards. A fluid pressure arrangement loads each of the springs simultaneously and a pre-set minimum force indicator is combined with a plurality of spring deflection indicators to indicate to the observer those springs which have reached a certain deflection prior to achieving the minimum loading.

9 Claims, 4 Drawing Figures

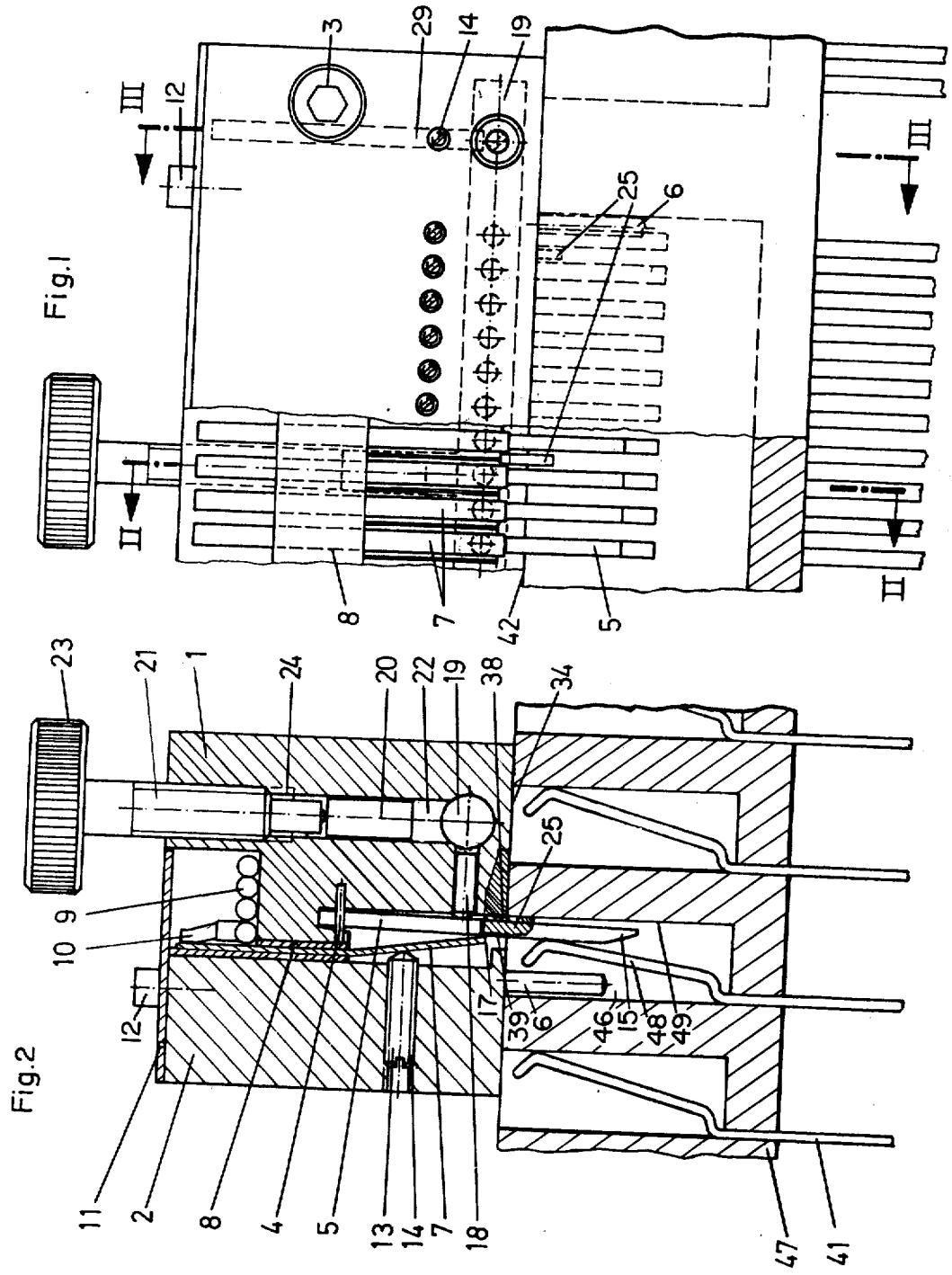

3,875,795

DEVICE FOR THE TESTING OF CONTACT SPRINGS

BACKGROUND OF THE INVENTION

The present invention deals with an apparatus as well as with a process for simultaneous testing of several contact springs clamped firmly, one next to the other.

In instruments related with electrical communication engineering as well as electronic data processing, a large number of printed circuits are utilized in which the individual printed-circuit boards are also equipped on their edges with imprinted connection contacts. These contacts are provided for the purpose of electrically connecting the printed circuit with other parts of the instrument, and are inserted in contact-spring boards or contact-spring assemblies. For an efficient and durable contact between the contact springs and contact fingers of the inserted printed-circuit board it is important that the contact springs lie on the contact fingers with a specified minimum pressure. The same holds also for electrical multiple contact plugs and plug boards. The present invention primarily concerns the testing of such contact springs in contact-spring boards and contact-spring assemblies, but may, however, also be applied to individual springs which are tested in series to best advantage, provided these springs are firmly clamped next to one another in a testing device.

In contact-spring assemblies as used in various instruments of electronic data processing, the spring force of the individual contact spring has hitherto been tested by a method that prestressed the spring by insertion of a gauge into the contact slot of the assembly a specified amount. The force required to extract the gauge from the contact slot was then measured by means of a spring balance. By this method, spring force of the contact spring is not directly measured, but only the friction due to the spring force between the gauge on the one hand, and the contact spring and the casing of the contact assembly, on the other hand. It is apparent that this measurement depends not only on the contact pressure of the contact spring, but to the same extent on the friction coefficient between the surfaces positioned next to one another, hence particularly on their surface roughness and material properties. This method can hardly be expected to provide reproducible measuring results.

The same applies to another method heretofore in use in which the gauge is inserted into the contact slot, and the weight of the gauge is so chosen that the gauge drops out of the contact slot if the minimum contact-spring pressure is not attained.

It is therefore an object of the invention to provide apparatus for the testing of several contact springs at the same time, which apparatus is reliable in operation, which furnishes reproducible measuring results and which is of the simplest possible construction.

This object is achieved by the present invention as will be hereinafter described and which is particularly set forth in the accompanying claims.

Further variations of the testing apparatus as well as a process for the simultaneous testing of several contact springs clamped firmly next to one another for maintaining a specified minimum contact pressure by means of this testing device are set forth in the following description and are further recited in the claims.

BRIEF DESCRIPTION OF THE DRAWINGS

For an interpretation of the invention, reference will be made hereafter to an embodiment presented in the accompanying drawings, wherein:

FIG. 1 shows, in the upper part, the testing apparatus, and in the lower part a contact-spring assembly in elevation and partially in section;

FIG. 2 shows a section through the testing apparatus as well as a part of the contact-spring assembly taken along the section line II—II of FIG. 1;

DESCRIPTION OF THE PREFERRED EMBODIMENT

Figure 4:
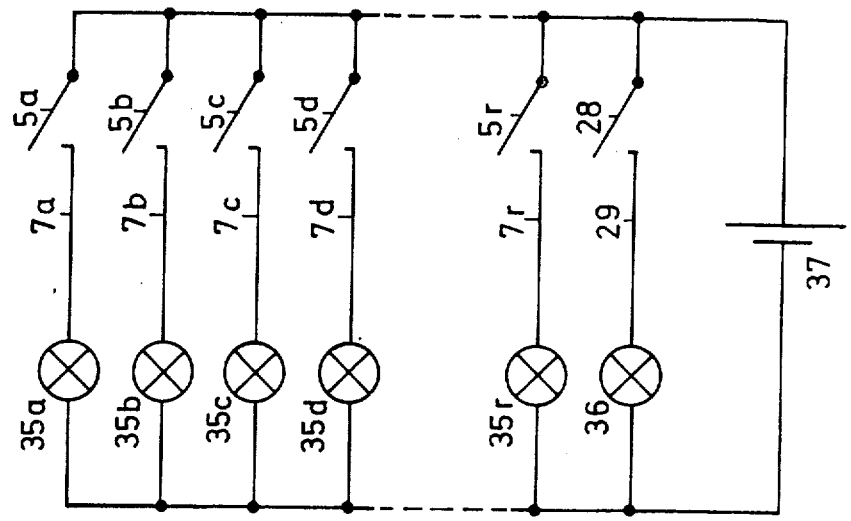
FIG. 4 shows the circuit diagram of an electrical signal device which may be employed in combination with the testing apparatus.

Referring now to FIGS. 1 and 2, the casing of the testing apparatus consists essentially of two parts 1 and 2 which are held together by two screws 3 (only one of which is shown). In the casing part 1 a plurality of swivel levers 5, extends downwardly and are placed in an articulate position on a plurality of pins 4. A plurality of centering pins 6, along with corresponding recesses 46 in the connecting block 47 containing the contact springs 48 ensure that the contact springs 48 of the connecting block 47 slide, along the inclined plane 15 of the swivel levers 5 when the testing apparatus is applied. The springs 48 are thus, according to the thickness of the swivel levers 5, prestressed by a certain amount.

Between the two casing parts 1 and 2 a number of electrical contacts 7, corresponding to the number of contact springs 48 or swivel levers 5, are clamped in each instance between two insulator plates 8 and thereby insulated from one another. The upper ends of the electrical contacts 7 as shown in FIG. 2 are connected by connecting lines 10 with the contacts 9 of a connecting board to which the signal lamps of a signal device pertaining to the testing apparatus may be linked. The hollow space containing the connecting lines 10 in the casing part 1 is closed toward the outside by a plate 11 which is fastened to the casing part 2 by means of the screws 12. The electrical contacts 7 are positioned with their free ends 17 extending into the swivel space of the swivel levers 5. The position of the free ends 17 may be adjusted. For this purpose a setscrew 13 is assigned to each contact 7 which setscrew is adjustable in a taphole 14 of the casing part 2. The setscrew 13 is made of plastic, or has at least an insulating plastic coating on the end adjoining the electrical contact 7.

An hydraulically movable pressure piston 18 is provided for each lever 5, and engages each of the respective swivel levers 5. The space behind each pressure piston is connected with a common pressure-medium canal 19 which, with reference to FIG. 1, extends over the entire width of the casing part 1. This common pressure-medium canal 19 is suitably formed by a through-hole which is sealed at its ends by locking screws. A plastically deformable mass is preferably used as pressure medium, as by way of example, material commercially available under the trade name Mipclam or PVC 5319. The use of such a plastically deformable mass as a pressure medium simplifies the sealing of the openings filled with pressure media greatly towards the exterior. A setting piston 20 is connected with the pressure-medium canal 19 and may be moved up and down by screw action of a headless screw 21, both being located in a borehole 22, and which serve for adjusting the pressure in the pressure-medium canal 19. For this purpose, the headless screw 21 is equipped with a knurled wheel 23 and the upper part of the borehole 22 is provided with a thread 24. Furthermore, four bracing angles 25 which are firmly built into the casing part 1 extend from the bottom side of the testing apparatus and when the connecting block 47 is plugged in, are supported by its surfaces 49 to form a support for the connecting block which absorbs the force of the pressure pistons 18 acting upon the contact springs 48.

Figure 3:
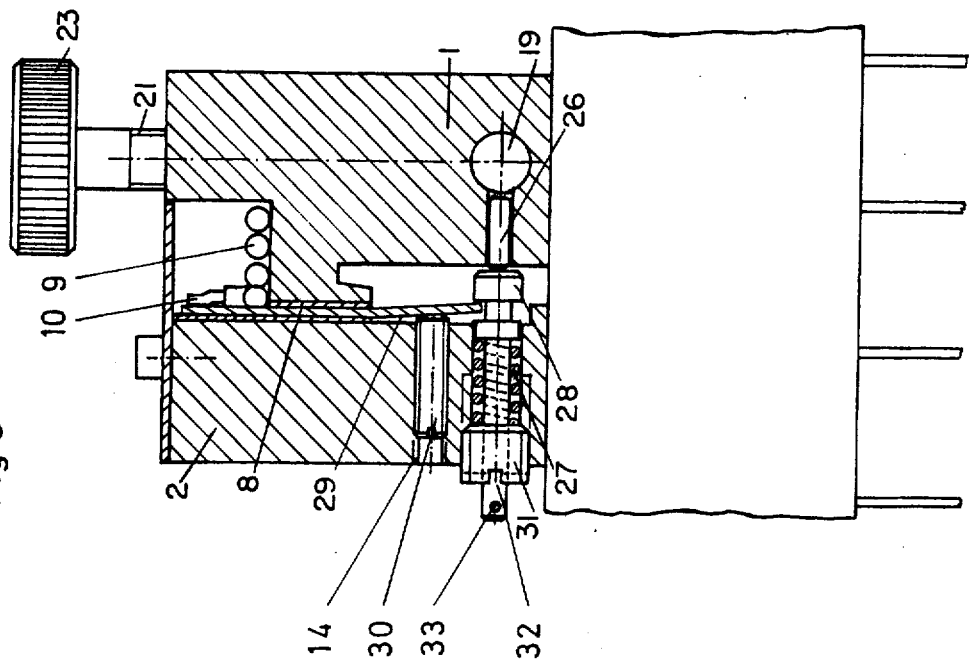
FIG. 3 shows a section through the testing apparatus taken along the section line III—III of FIG. 1.

The pressure-signal device, moreover, as illustrated in FIG. 3, is connected with the common pressure-medium canal 19. It includes an additional pressure piston 26 which acts upon a slide bar 28 adjustable against the force of a spring 27. An additional electrical contact 29 extends into the piston displacement of the slide bar 28 which also may be adjusted, as the contacts 7, by means of a setscrew 30. The spring 27 is on the one hand supported by the slide bar 28, and, on the other hand, by a setscrew 31 adjustable in the casing part 2. The extension 32 of the slide bar 28 protrudes through a central borehole of the setscrew 31 to the exterior. At the free end of the extension 32, an eyelet 33 is provided for conection to a spring balance. The prestress of the spring 27 may thereby be set. The electric contact 29 is connected with a source of current to signal lamp 36 (not shown in FIG. 3, but schematically depicted in FIG. 4).

FIG. 4 illustrates the circuit of a signal device pertaining to the testing apparatus. Each of the swivel levers 5a to 5r is connected electrically with the casing part 1 due to its mounting on a pin 4. The electrical contacts 7a to 7r facing the individual swivel levers 5a to 5r are electrically insulated from each other and each linked with a signal lamp 35a to 35r. A battery 37 is connected, on the one hand, with the casing 1 and, on the other hand, with the contacts of the signal lamps 35a to 35r connected with one another.

An additional signal lamp 36 is connected in the pressure-signal device, on the one hand, with the battery 37, and, on the other hand, to the electrical contacts 29, while the slide bar 28 is linked electrically over the casing part 2 with the casing part 1, hence with the other pole of the battery. It goes without saying, that instead of a battery any other source of current may be used. As soon as the respective swivel lever 5a to 5r touches one of the contacts 7a to 7r, or the slide bar 28 touches the contact 29, the corresponding signal lamp 35a to 35r or 36, lights up.

In the following paragraphs the application of the test apparatus according to the invention is explained for the simultaneous testing of several contact springs clamped in next to one another, for maintenance of a specified minimum contact pressure. The contact springs 48 are in this case inserted in a connecting block 47, as for instance used in the connection of printed circuits with other instrument parts of data-processing instruments. The contact springs 48 have, for this purpose, extensions 41 which protrude in the form of rectangular rods from the rear of the connecting block 47 and are connected with connecting wires according to the known wire-wrap process.

As best shown in FIGS. 1 and 2, when the testing apparatus is applied to the connecting block 47 the pins 6, when sliding into the recesses 46, provide for appropriate guidance. The test apparatus is thus moved onto the connecting block 47 until its cover surface 42 rests against the base surface 34 of the test apparatus. The ends of the contact springs 48 thereby slide over the inclined plane 15 of the levers 5 and are thus prestressed by the amount of the thickness of the levers 5. All electrical contacts 7 which for example consist of a piece of bandsteel, have previously been prestressed by means of the setscrews 13 in such a way that all their ends 17 are positioned the same distance from the contact surface 38 for the swivel levers 5. For this purpose the setscrews 13 are turned back as far as possible and then a gauge, corresponding with the desired distance between the end 17 of the electrical contact 7 and the plane 39 of the swivel lever 5 facing it, is inserted between the contact and the lever. The distance between the contact surface 38 and the end 17 of the electrical contact corresponds with that deformation of the contact spring 48 in the operation which must be warranted for a certain specified contact pressure. The setscrew 13 is then tightened until the contact 7 rests on the mentioned gauge and thus the respective signal lamp lights up. All of the electrical contacts 7a to 7r are set in this manner.

Before the testing proper of the contact springs 48 begins, the minimum contact pressure of the test apparatus necessary for the desired deformation must still be set. For this purpose the pressure-indicator device shown in FIG. 3 is used. The electrical contact 29 of this instrument was set first in the same way as previously explained with respect to the contacts 7, in such a manner that the slide bar 28 rests on the contact 29 when the pressure in the pressure-medium canal 19 is exactly at a value high enough to correspond with the minimum force of a contact spring. This minimum force is set with the aid of a spring balance by means of a setscrew 31 through prestress of the spring 27 in such a fashion that at closing of the contact 28, 29 a force exactly corresponding to the desired contact pressure is exerted by the spring 27 upon the slide bar 28. This setting occurs, however, only once at the adjustment of the testing apparatus and is then maintained.

During the testing process proper for the contact springs, the testing apparatus is, as mentioned, introduced onto the connecting block 47 such that its cover surface 42 rests on the base surface 34 of the test apparatus. The contact springs 48 are thereby prestressed by the levers 5 by a certain amount. The pressure in the pressure-medium canal 19 is slowly raised by turning of the knurled wheel 23. Thus, the pistons 18 shift and push the levers 5 away from the contact surface 38 and assume the position illustrated in FIG. 2. The contact springs 48 are thereby simultaneously stressed to an increasing extent. To prevent the connecting block 47 from changing its position in this process, its support surfaces 49 lie on the bracing angles 25 built into the casing part 1. According to their rigidity, the contact springs 48 are more or less bent under a certain pressure in the canal 19. When the bending has reached the point where the swivel lever 5 rests on the electrical contact 7, the respective signal lamp 35 lights up. The pressure increase in the canal 19 is continued until the slide bar 28 of the pressure-indicator device rests on the respective contact 29. This is the moment which corresponds, on the one hand, with the attaining of the specified operational deformation of the contact spring and, on the other hand, with the minimum contact pressure required for this deformation. All contact springs which do not attain this minimum contact pressure are already so far deformed, at lower pressures in the pressure-medium canal, that the respective swivel lever 5 has come to rest against the respective electrical contact 7. The signal lamps assigned to these weaker contact springs therefore light up before the signal lamp 36. Thus all contact springs may be checked simultaneously in one operational step and the result is indicated by the respective signal lamps lighting up before lamp 36.

Prior to the next testing operation the pressure medium is relieved by turning back the wheel 23 and thus releasing the pressure on the adjustment piston 20.

This invention may, not only be employed for the testing of contact springs in connecting blocks, but also for the testing of any other desired types of contact-spring boards. The testing apparatus according to the invention, furthermore, also permits the testing of loose contact springs, provided that they are clamped into a device for the testing. Instead of a signal lamp 36 for generating a signal lighting up at the attainment of the specified minimum pressure, an instrument continuously indicating the pressure, or an acoustical signal transmitter may also be used.

What is claimed is:

1. A device for the simultaneous testing of a plurality of contact springs which are firmly clamped next to one another, comprising; a casing containing a plurality of hydraulically movable piston means, each disposed for deforming a respective spring during movement thereof, each of said piston means being connected with a common canal disposed in said casing and containing a pressure medium, pressure adjusting means interconnected with said pressure-medium canal for acting upon said pressure medium, means interconnected with said pressure-medium canal for indicating the pressure in said canal, a plurality of electrical contacts each being disposed in the path of a respective one of said contact springs during the deformation thereof, each of said contacts being insulated from one another and from said casing, a plurality of signal means each electrically connected to one of said contacts, and a source of electrical current connected to each of said contacts and its respective contact spring through said respective signal means whereby energization of a respective signal means occurs when one of said contact springs touches a respective contact through deformation of said spring by said associated piston means.

2. A device as set forth in claim 1 which further includes a plurality of swivel levers, each of said levers being pivotably mounted on said casing and having one portion thereof aligned with a contact spring and another portion thereof aligned with the respective piston means of said spring whereby said piston means acts through said lever to deform said contact spring.

3. A device as set forth in claim 1 wherein said pressure adjusting means comprises an adjustable piston disposed in said canal.

4. A device as set forth in claim 1 wherein said pressure indicating means comprises a pressure piston disposed in said canal and having its outer end connected to a slide bar supported in said casing, said slide bar and piston being biased against the pressure in said canal by a spring mounted in said casing, an electrical contact extending into the path of said slide bar when moved by said piston, said contact and slide bar being connected to a source of current, and a signal lamp connected into said circuit whereby current flow takes place through said signal lamp when said slide bar touches said contact.

5. A device as set forth in claim 4 characterized in that said spring is a coil spring which is adjustably prestressed.

6. A device as set forth in claim 5 wherein said coil spring is disposed in said casing with an end supported by said slide bar and the opposite end supported by a setscrew threaded into said casing, the adjustant of said spring prestress being accomplished by rotation of said setscrew to move said setscrew relative to said slide bar.

7. A device as set forth in claim 6 wherein said coil spring is axially aligned with said slide bar and said setscrew and wherein said setscrew is provided with an opening therein, said slide bar having a portion extending through said coil spring and the opening in said setscrew and external of said casing for applying a measured prestress to said spring.

8. A device as set forth in claim 4 wherein each of said electrical contacts associated with said contact springs is provided with means for adjustment relative to its respective contact spring and said electrical contact associated with said slide bar is provided with means for adjustment relative to said slide bar.

9. A device as set forth in claim 1 wherein said pressure medium comprises a plastically deformable mass.

* * * * *